(12) United States Patent
Matsushita et al.

(10) Patent No.: US 9,298,742 B2
(45) Date of Patent: Mar. 29, 2016

(54) INFORMATION PROCESSING APPARATUS AND CONTROL METHOD THEREOF

(71) Applicant: CANON KABUSHIKI KAISHA, Tokyo (JP)

(72) Inventors: Takahiro Matsushita, Tokyo (JP); Yuki Wada, Bangalore (IN)

(73) Assignee: Canon Kabushiki Kaisha, Tokyo (JP)

(*) Notice: Subject to any disclaimer, the term of this patent is extended or adjusted under 35 U.S.C. 154(b) by 11 days.

(21) Appl. No.: 14/155,467

(22) Filed: Jan. 15, 2014

(65) Prior Publication Data

US 2014/0218545 A1 Aug. 7, 2014

(30) Foreign Application Priority Data

Feb. 4, 2013 (JP) .................. 2013-019886

(51) Int. Cl.
*G06F 17/30* (2006.01)
*H04N 1/21* (2006.01)
*H04N 1/32* (2006.01)

(52) U.S. Cl.
CPC .... *G06F 17/30247* (2013.01); *G06F 17/30817* (2013.01); *G06F 17/30849* (2013.01); *G06F 17/30858* (2013.01); *H04N 1/212* (2013.01); *H04N 1/32128* (2013.01); *H04N 2201/3226* (2013.01); *H04N 2201/3247* (2013.01)

(58) Field of Classification Search
CPC . H04N 1/2112; H04N 1/212; H04N 1/32128; H04N 2201/3226; H04N 2201/3228; H04N 2201/3229; H04N 2201/3247; G06F 17/30247; G06F 17/30817; G06F 17/30849; G06F 17/30858
See application file for complete search history.

(56) References Cited

U.S. PATENT DOCUMENTS

| | | | |
|---|---|---|---|
| 2003/0174217 A1* | 9/2003 | Kito et al. ................ | 348/231.2 |
| 2007/0047918 A1* | 3/2007 | Park ................... | G11B 27/032 386/224 |
| 2007/0147787 A1* | 6/2007 | Ogawa et al. ............. | 386/107 |
| 2009/0295946 A1* | 12/2009 | Shioji .................. | 348/231.99 |
| 2010/0002096 A1* | 1/2010 | Hong ..................... | 348/231.3 |
| 2010/0092150 A1* | 4/2010 | Bae .................... | G11B 27/034 386/278 |
| 2013/0243389 A1* | 9/2013 | Seto ...................... | H04N 5/772 386/225 |
| 2015/0036020 A1* | 2/2015 | Shehane et al. .......... | 348/231.2 |

FOREIGN PATENT DOCUMENTS

JP  2004-328034 A  11/2004

* cited by examiner

*Primary Examiner* — Daniel M Pasiewicz
(74) *Attorney, Agent, or Firm* — Cowan, Liebowitz & Latman, P.C.

(57) ABSTRACT

An information processing apparatus which searches for a plurality of image files shot in succession from among a plurality of files, comprises a search unit which searches for the image files based on file attributes; an obtaining unit which obtains associated information added to each of the found image files; a determination unit which determines whether continuity exists between a plurality of image files having the same attribute based on the associated information; and a setting unit which sets the plurality of image files determined to have continuity as belonging to the same group, wherein the associated information added to each image file includes identification information indicating a file of an image shot after that file, and identification information indicating a file of an image shot before that file.

8 Claims, 13 Drawing Sheets

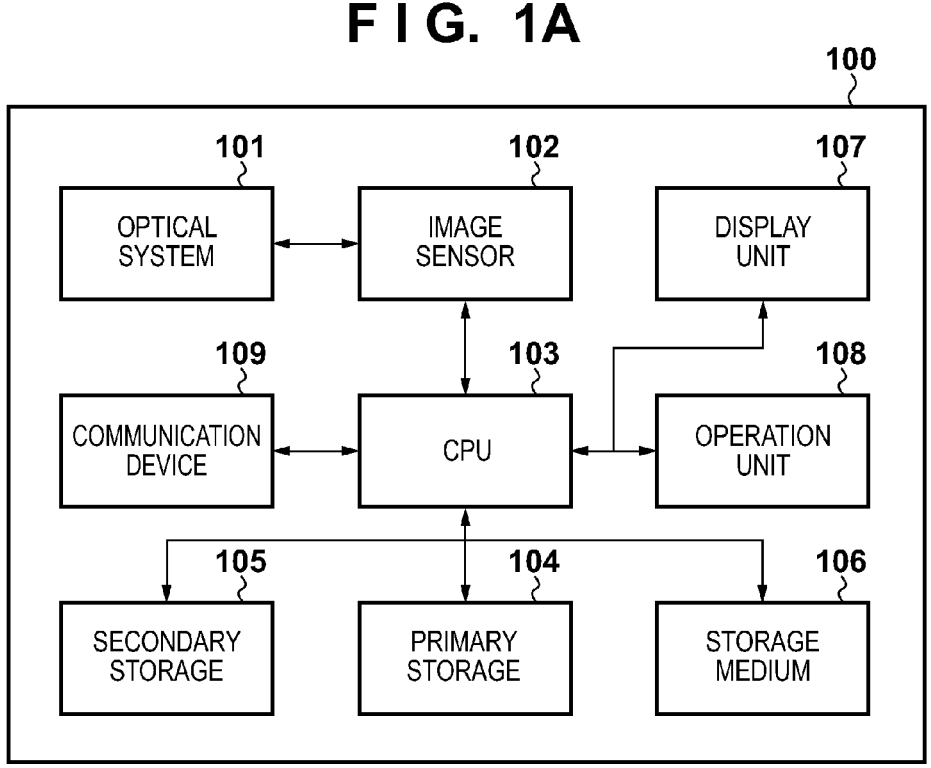
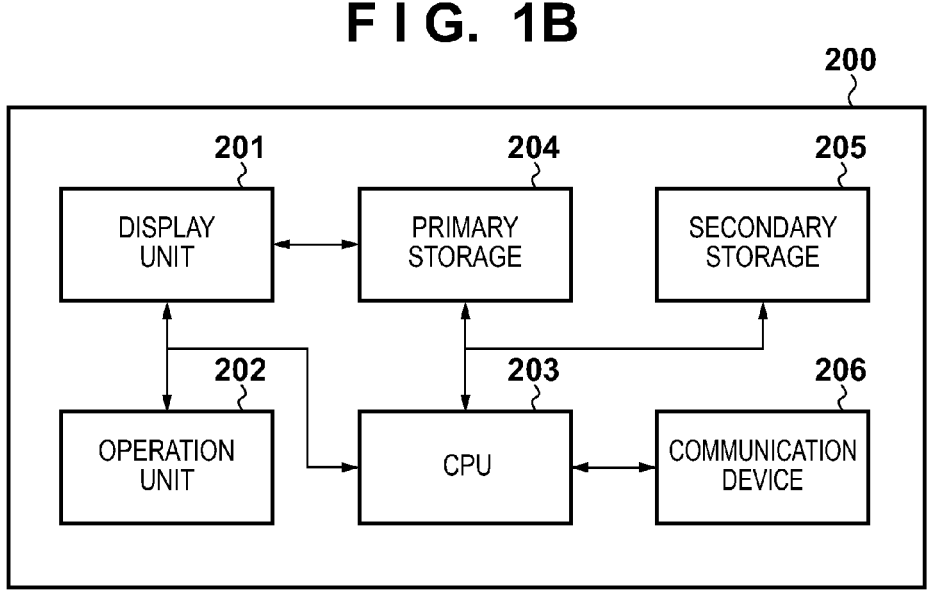

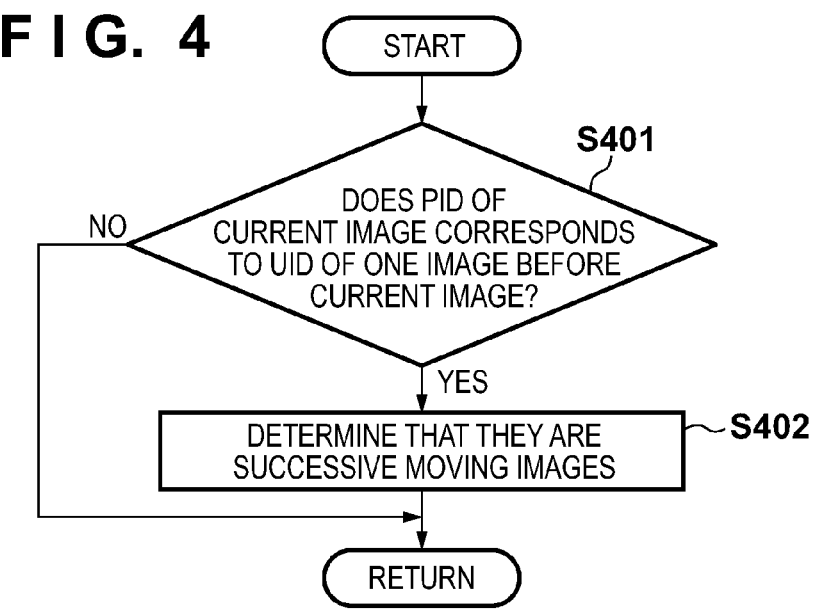
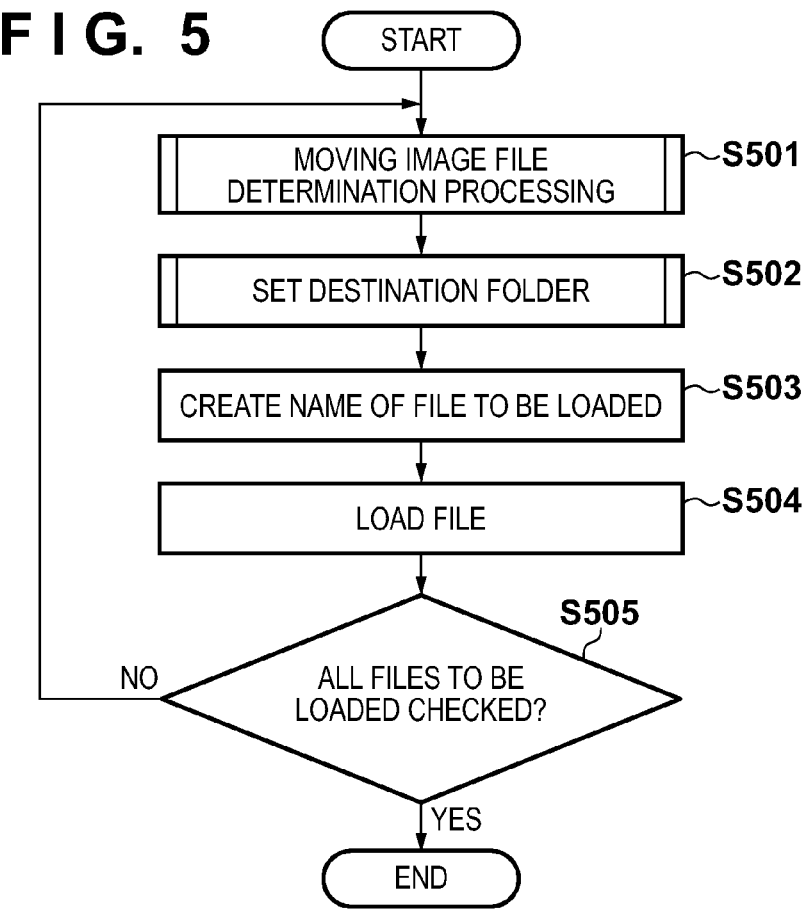

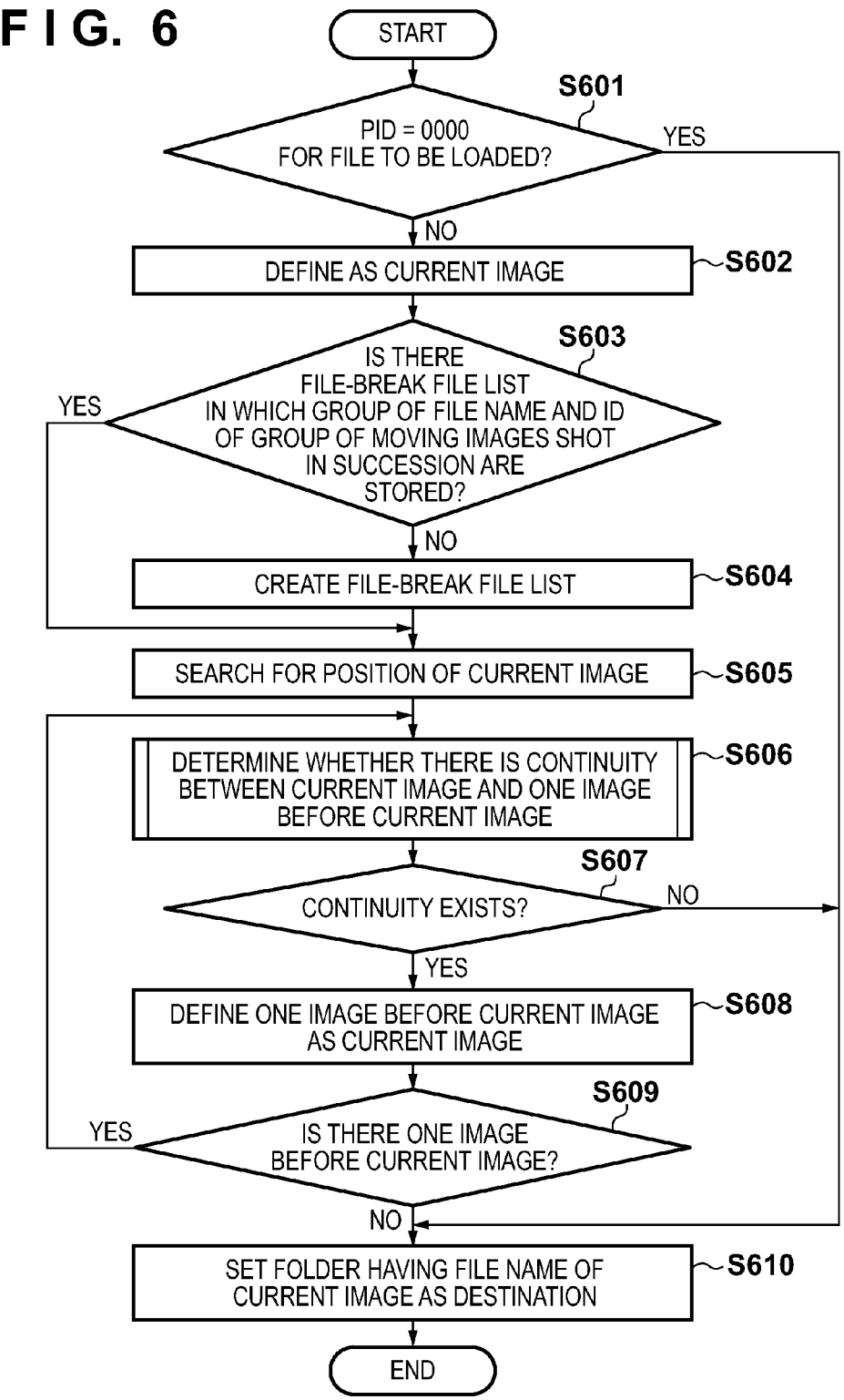

INFORMATION PROCESSING APPARATUS AND CONTROL METHOD THEREOF

BACKGROUND OF THE INVENTION

1. Field of the Invention

The present invention relates to a technique for searching for successive moving images.

2. Description of the Related Art

Image capturing apparatuses, such as digital cameras, commonly record moving images according to the DCF standard, and it is thus possible to determine whether the recorded moving images belong to a group of files of moving images shot in succession, based on a numerical sequence of file names. For example, if file MVI_0001.MP4 is the leading image of moving images shot in succession and there is a file named MVI_0002.MP4, it is most efficient to check whether MVI_0001.MP4 and MVI_0002.MP4 are moving images shot in succession.

For example, there is a method as disclosed in Japanese Patent Laid-Open No. 2004-328034 in which, in the case where a temporally successive moving image is divided and the divided moving images are recorded with different file names in a plurality of recording media, data of these moving images is temporally reproduced in succession.

However, the processing takes time when associated information is obtained from all of the moving image files without reference to a numerical sequence of file names, in order to find out which files belong to a group of files of moving images shot in succession.

Also, according to Japanese Patent Laid-Open No. 2004-328034, the plurality of files of moving images recorded in a divided manner are recorded such that link information is added to each moving image file, the link information indicating the moving image file temporally subsequent to the corresponding moving image file, and data of the plurality of moving images can temporally be reproduced in succession based on the link information. However, such link information makes searching for a moving image file that was recorded temporally before the moving image file selected by a user difficult, for example. This can be overcome if, for example, link information has been obtained in advance from all the pieces of moving image data and it has been determined in advance whether they are moving images shot in succession, but such processing takes time and needs a large memory.

Also, if moving image data obtained by combining the divided files exceeds the upper limit of the file size of a file system of a destination, combining of the files will fail.

Further, when a still image is shot during a shooting of a moving image, a file number next to that of the moving image file currently being recorded is assigned to the still image, and thus moving images have no consecutive file numbers. Therefore, continuity determination based on file names may be insufficient.

SUMMARY OF THE INVENTION

The present invention has been made in consideration of the aforementioned problems, and provides a technique that enables a more efficient search for successive files.

In order to solve the aforementioned problems, the present invention provides an information processing apparatus which searches for a plurality of image files shot in succession from among a plurality of files, comprising: a search unit configured to search for the image files based on file attributes; an obtaining unit configured to obtain associated information added to each of the found image files; a determination unit configured to determine whether continuity exists between a plurality of image files having the same attribute based on the associated information; and a setting unit configured to set the plurality of image files determined to have continuity as belonging to the same group, wherein the associated information added to each image file includes identification information indicating a file of an image shot after that file, and identification information indicating a file of an image shot before that file.

In order to solve the aforementioned problems, the present invention provides a control method of an information processing apparatus which searches for a plurality of image files shot in succession from among a plurality of files, the method comprising the steps of: searching for the image files based on file attributes; obtaining associated information added to each of the found image files; determining whether continuity exists between a plurality of image files having the same attribute based on the associated information; and setting the plurality of image files determined to have continuity as belonging to the same group, wherein the associated information added to each image file includes identification information indicating a file of an image shot after that file, and identification information indicating a file of an image shot before that file.

According to the present invention, successive files are identified based on file attributes, and then associated information on the files is analyzed, thus eliminating the need to obtain associated information from all the files. Therefore, it is possible to search for successive files more efficiently.

Further features of the present invention will become apparent from the following description of exemplary embodiments (with reference to the attached drawings).

BRIEF DESCRIPTION OF THE DRAWINGS

FIG. 1A is a block diagram illustrating a configuration of an image capturing apparatus of an embodiment according to the present invention.

FIG. 1B is a block diagram illustrating a configuration of an information processing apparatus of an embodiment according to the present invention.

FIG. 4 is a flowchart illustrating processing for determining continuity between moving image files according to the present embodiment.

FIG. 5 is a flowchart illustrating file loading processing according to the present embodiment.

FIG. 6 is a flowchart illustrating processing for setting a file loading destination according to the present embodiment.

DESCRIPTION OF THE EMBODIMENTS

Figure 2:
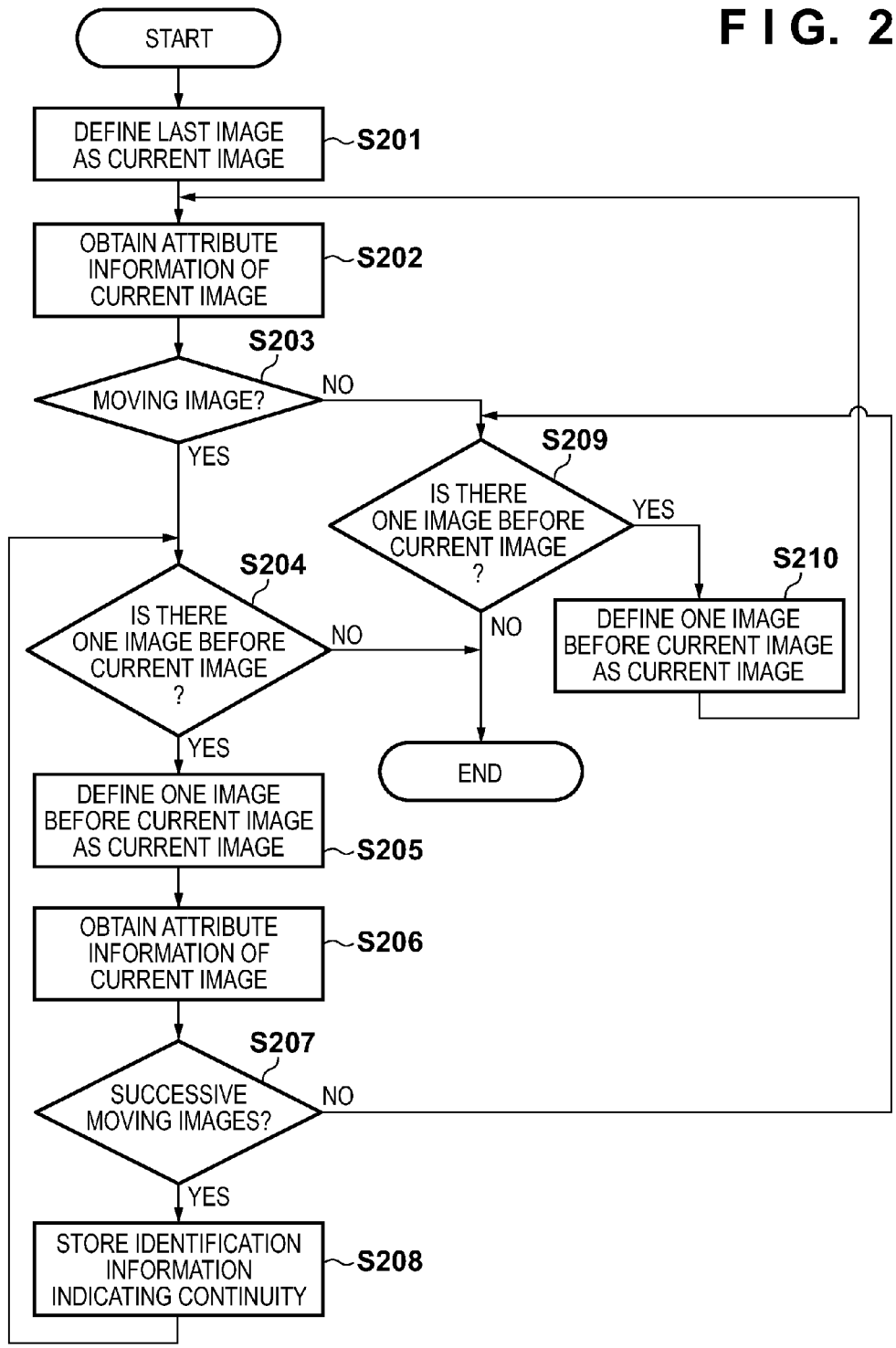
FIG. 2 is a flowchart illustrating moving image file determination processing according to the present embodiment.

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described subsequently may be properly combined.

First Embodiment

The following will describe an example of an information processing apparatus of the present invention that is implemented by a personal computer (hereinafter, referred to as "PC"), but the present invention is also applicable to image capturing apparatuses, such as digital cameras for shooting a moving image or a still image, or portable electronic devices such as smartphones.

The PC of the present embodiment has a function to search for data of a plurality of moving images that were shot temporally in succession and recorded in a divided manner with different file names in recording media such as an embedded memory or an external memory card of a camera, which serves as an image capturing apparatus, and to load the found moving images altogether into the PC, and the processing is executed by image management applications (hereinafter, referred to as "applications") installed in the PC and the camera. Note that, as in the embodiment described later, algorithms of the applications of the PC and the camera may be different or modified.

Camera Configuration

A configuration of the camera of the present embodiment will be described with reference to FIG. 1A.

In FIG. 1A, a camera 100 includes an optical system 101, an image sensor 102, a CPU 103, a primary storage 104, a secondary storage 105, a storage medium 106, a display unit 107, an operation unit 108, and a communication device 109.

The optical system 101 is constituted by a lens, a shutter, and a diaphragm, and forms an image on the image sensor 102 with an appropriate amount of light from a subject and at an appropriate timing. The image sensor 102 converts the light that has passed through the optical system 101 and with which the image is formed into an electric signal. The CPU 103 performs, in accordance with the input signal and a program, various types of calculations and control of each component of the camera 100. The primary storage 104 is a volatile memory or the like that stores temporary data, and is used for operation of the CPU 103. The secondary storage 105 is a hard disk drive or the like, and stores a program (firmware) for controlling the camera 100, various types of setting information, and the like. The storage medium 106 stores data of shot images, a face dictionary, and the like. Note that the storage medium 106 can be removable from the camera 100, and can be installed in a PC 200 described later, or the like so as to enable image data to be read out. That is, the camera 100 suffices to include a device which accesses the storage medium 106 and enables data to be read from and written into the storage medium 106. Note that, although the face dictionary is stored in the storage medium 106, the face dictionary may be stored in the secondary storage 105. The display unit 107 displays view finder images during a shooting, shot images, characters for dialog type operations, and the like. Registration of the face dictionary is also performed on the display unit 107, and the registered face dictionary is displayed by the display unit 107. The operation unit 108 accepts operations of a user. For the operation unit 108, for example, buttons, levers, a touch panel, and the like can be employed. The communication device 109 connects to an information processing apparatus such as a PC so as to send and receive control commands, data, and the like. For example, Picture Transfer Protocol (PTP), Media Transfer Protocol (MTP), and the like are used as a protocol with which connection to the information processing apparatus is established so as to perform data communication. Note that the communication device 109 may perform communication using, for example, wired connection such as a universal serial bus (USB) cable. The communication device 109 may also perform communication using wireless connection such as a wireless LAN. Alternatively, the communication device 109 may be connected to the information processing apparatus directly, via a server, via a network such as the Internet, or the like.

In the case where a long period shooting of a moving image is performed using the camera 100 of FIG. 1A, recording of one moving image file ends when a predetermined time has elapsed or when a predetermined data size is reached, and a new moving image file that corresponds to the subsequent shooting is created. Therefore, a plurality of successive moving image files are recorded in a memory card, and file numbers thereof are consecutive. Also, shooting of a still image is allowed during a shooting of a moving image. When a still image is shot during a shooting of a moving image, the file number subsequent to that of the moving image file currently being recorded is assigned to the still image, and thus the file numbers of the moving images are not consecutive. Each moving image file has attribute information recorded therein that includes identification information indicating the file recorded after the corresponding file, and identification information indicating the file recorded before the corresponding file. In this regard, a detailed description will be given with reference to FIG. 3.

PC Configuration

A configuration of the PC of the present embodiment will be described with reference to FIG. 1B.

In FIG. 1B, a PC 200 includes a display unit 201, an operation unit 202, a CPU 203, a primary storage 204, a secondary storage 205, and a communication device 206. The basic functions of the above-described components are similar to those of the camera 100, and thus detailed descriptions thereof are omitted. Note that a liquid crystal display panel (LCD) or the like is applied to the display unit 201. Also, the PC 200 does not necessarily include the display unit 201, and suffices to have a display control function to control display of the display unit 201. A keyboard, a mouse, and the like are applied to the operation unit 202, which is used for allowing a user to select a moving image file, for example.

Moving Image File Determination Processing

The following will describe, with reference to FIG. 2, processing for determining continuity between moving image files when the moving image files are loaded into the PC from the camera according to the present embodiment.

Note that the following processing is realized by the CPU 203 executing the application installed in the PC 200.

First, the processing of FIG. 2 starts when the camera 100 and the PC 200 are connected to each other, and communication between the camera 100 and the PC 200 is established via the communication devices 109 and 206. Note that the processing of FIG. 2 may be triggered when the PC 200 detects that a memory card is installed therein.

FIG. 2 shows processing for determining, from the last image (an image with the greatest file number when only images conforming to the ordinary DCF standard are stored in the memory card), whether the image is a moving image, and whether continuity exists between the last image and the image recorded before the last image.

Note that, in the present embodiment, if the moving images conform to the DCF standard, a search for continuity between the moving images is performed in descending order of the file numbers, but the search may also be performed in ascending order of the file numbers.

Also, in the following description, it is assumed that all images in the memory card are targets for the search, but when only moving images in the same group of the selected moving image, for example, are searched, a modification is also possible such that the search is performed in both ascending order and descending order of file numbers starting from the selected image. In this case, the search may be stopped once continuity no longer exists between the current image and a searched moving image, instead of being performed with respect to all the images.

In FIG. 2, the CPU 203 defines, in step S201, the last image as the current image and obtains, in step S202, attribute information, such as a file name extension, of the current image.

In step S203, the CPU 203 determines whether the current image is a moving image based on the attribute information obtained in step S202. Although, here, attribute information such as an extension is used for determination, other methods may be used for determination.

When it is determined in step S203 that the current image is a moving image, the procedure advances to step S204, where the CPU 203 determines whether there is an image whose file name indicates one image before the current image in the numerical sequence, and if it is determined that there is such an image, the procedure advances to step S205, where the CPU 203 defines the image whose file name indicates one image before the current image in the numerical sequence, as the current image.

In step S206, the CPU 203 obtains attribute information of the current image set in step S205.

In step S207, the CPU 203 determines whether continuity exists between the current image and one image before the current image. If it is determined in step S207 that the continuity exists, the procedure advances to step S208, where the CPU 203 adds identification information indicating that continuity exists between the current image and one image before the current image to the attribute information of the files, stores the files in the memory card, and repeats the procedures from step S204. This identification information includes identification information indicating an image file shot after the current image, and identification information indicating an image file shot before this image file.

On the other hand, if it is determined in step S203 that the current image is not a moving image, or in step S207 that continuity does not exist between the current image and one image before the current image, the procedure advances to step S209, where the CPU 203 determines, similarly to step S204, whether there is an image before the current image. Then, if it is determined in step S209 that there is an image before the current image, the procedure advances to step S210, where the CPU 203 defines one image before the current image, as the current image, and repeats the procedures from step S202.

Also, if it is determined in step S204 or S209 that there is no image before the current image, this processing ends.

In this way, it is most efficient to determine whether images are successive moving images based on the numerical sequence, the time sequence, and the like of the file names of the images. Although it is here determined whether continuity exists between the current image and one image before the current image, it is also possible to determine whether continuity exists between the current image and one image after the current image.

Figure 3:
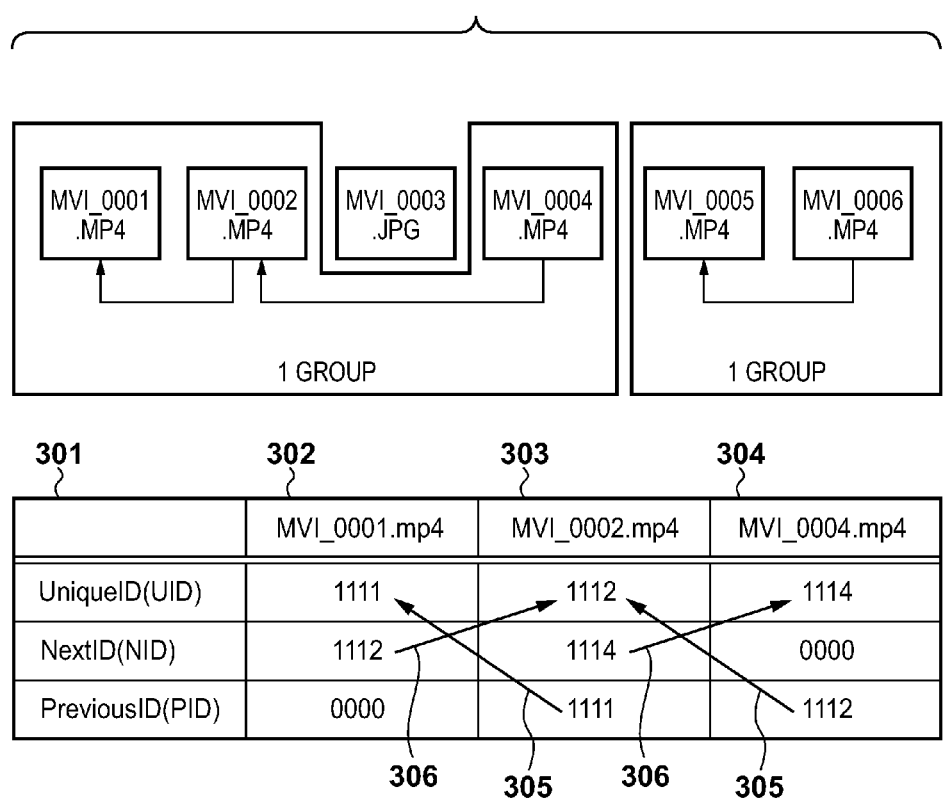
FIG. 3 is a diagram illustrating data structure of moving image files according to the present embodiment.

FIG. 3 shows an example of five MP4 files serving as moving images shot in succession. Here, the MP4 files obtained by dividing a successively shot moving image and recording the divided moving images are referred to as "file break MP4" files. Note that file break processing is functions to close moving image data when the moving image data reaches a predetermined capacity (e.g., 2G Byte) during a shooting of a moving image, to newly create a separate file, and to continue recording the subsequent moving image data.

Three IDs, that is, Unique ID (UID), Next ID (NID), and Previous ID (PID), as associated information 301, are added to each MP4 file. UID is unique information indicating a file. NID is identification information indicating UID of the next file-break file. PID is an ID indicating UID of the previous file-break file.

Then, the CPU 203 determines whether continuity exists between the current image and the corresponding image as follows:

If the image file has no NID, or has NID of 0000, Null, or the like, it is determined that there is no successive file after the current image.

If the image file has no PID, or has PID of 0000, Null, or the like, it is determined that there is no successive file before the current image.

If the image file has none of NID and PID, or has NID and PID of 0000, Null, or the like, it is determined that there are no successive files before and after the current image, and the image is an independent file.

Note that, since a still image can be shot during a shooting of a moving image, not only the numerical sequence of the files but also information indicating which files are respectively subsequent to the files with these IDs is written in the file. A file whose both NID and PID are 0000 is not a file-break file since none of the files before and after the current image is indicated.

Since MVI_0001.MP4 with the reference numeral 302 has PID of 0000 but NID of 1112, it is clear that MVI_0001.MP4 is the leading moving image of the file-break files.

Next, since, as shown in an arrow 305, PID of MVI_0002.MP4 with the reference numeral 303 corresponds to UID of MVI_0001.MP4, it is clear that MVI_0001.MP4 and MVI_0002.MP4 are moving images shot in succession. It is also possible to check that, as indicated by an arrow 306, NID of MVI_0001.MP4 corresponds to UID of MVI_0002.MP4.

Similarly, since PID of MVI_0004.MP4 with the reference numeral 304 corresponds to UID of MVI_0002.MP4, it is clear that MVI_0002.MP4 and the MVI_0004.MP4 are moving images shot in succession, and further since NID of MVI_0004.MP4 is 0000, it is clear that MVI_0004.MP4 is the last moving image of the file-break files. The reason why the discontinuous file name "MVI_0004.MP4" is used, instead of MVI_0003.MP4, is that there is MVI_0003.JPG that is a still image shot during the shooting of the moving image.

Therefore, it is necessary to determine continuity using not only the numerical sequence of file names but also IDs. Accordingly, since the leading file-break MP4 file to the last file-break MP4 file are found, it is possible to determine that MVI_001.MP4, MVI_002.MP4, and MVI_004.MP4 belong to a file group of moving images shot in succession. Since the same group is determined in this manner based on the numerical sequence of the file names, it is not necessary to obtain an ID group of MVI_005.MP4 and MVI_006.MP4.

File Continuity Determination Processing

Next, processing performed in step S207 of FIG. 2 for determining continuity between two images arranged in series will be described with reference to FIG. 4.

In FIG. 4, the CPU 203 determines, in step S401, whether PID of the current image corresponds to UID of the file of one image before the current image. Note that it is also possible to check whether UID of the current image corresponds to NID of one image before the current image.

If it is determined, in step S401, that PID of the current image corresponds to UID of the file of one image before the current image, the procedure advances to step S402, where the CPU 203 determines that the current image and one image before the current image are successive moving images.

Note that when the search is performed in the ascending order of file numbers in the processing of FIG. 2, a modification can be made to the determination such that it is determined whether PID of the current image file corresponds to UID of one file after the current image file.

File Load Processing

The following will describe, with reference to FIG. 5, processing for loading the group of moving image files (hereinafter, referred to as "moving image group") that were determined to be successive moving images by the processing of FIGS. 2 and 4, altogether in a specific folder.

Note that the following processing is realized by the CPU 203 executing the application installed in the PC 200.

First, the processing of FIG. 5 starts when the camera 100 is connected to the PC 200 and communication between the camera 100 and the PC 200 is established via the communication devices 109 and 206. Note that the processing of FIG. 5 may be triggered when the PC 200 detects that a memory card is installed therein.

In step S501, the CPU 203 performs the moving image file determination processing described with reference to FIG. 2.

In step S502, the CPU 203 searches for a group of moving images shot in succession based on the identification information indicating continuity that was added to each file through the processing of FIG. 2, and sets a destination folder in which these moving images are to be loaded. As a method for setting a folder, for example, a method for creating a folder having the file name of the leading file in the same group, and loading a group of moving images shot in succession into this folder, and other methods are applicable. The reason why a folder is set is that when a group of moving images shot in succession is loaded into the PC 200, file management is easy for a user if files of the same group are stored in the same folder, or combining processing for combining these files later into one file is made simple. This processing will be described in detail later.

In step S503, the CPU 203 creates file names of images to be loaded. This processing is executed, after the images have been loaded into the PC 200, to change the file names of the loaded images.

Figure 7:
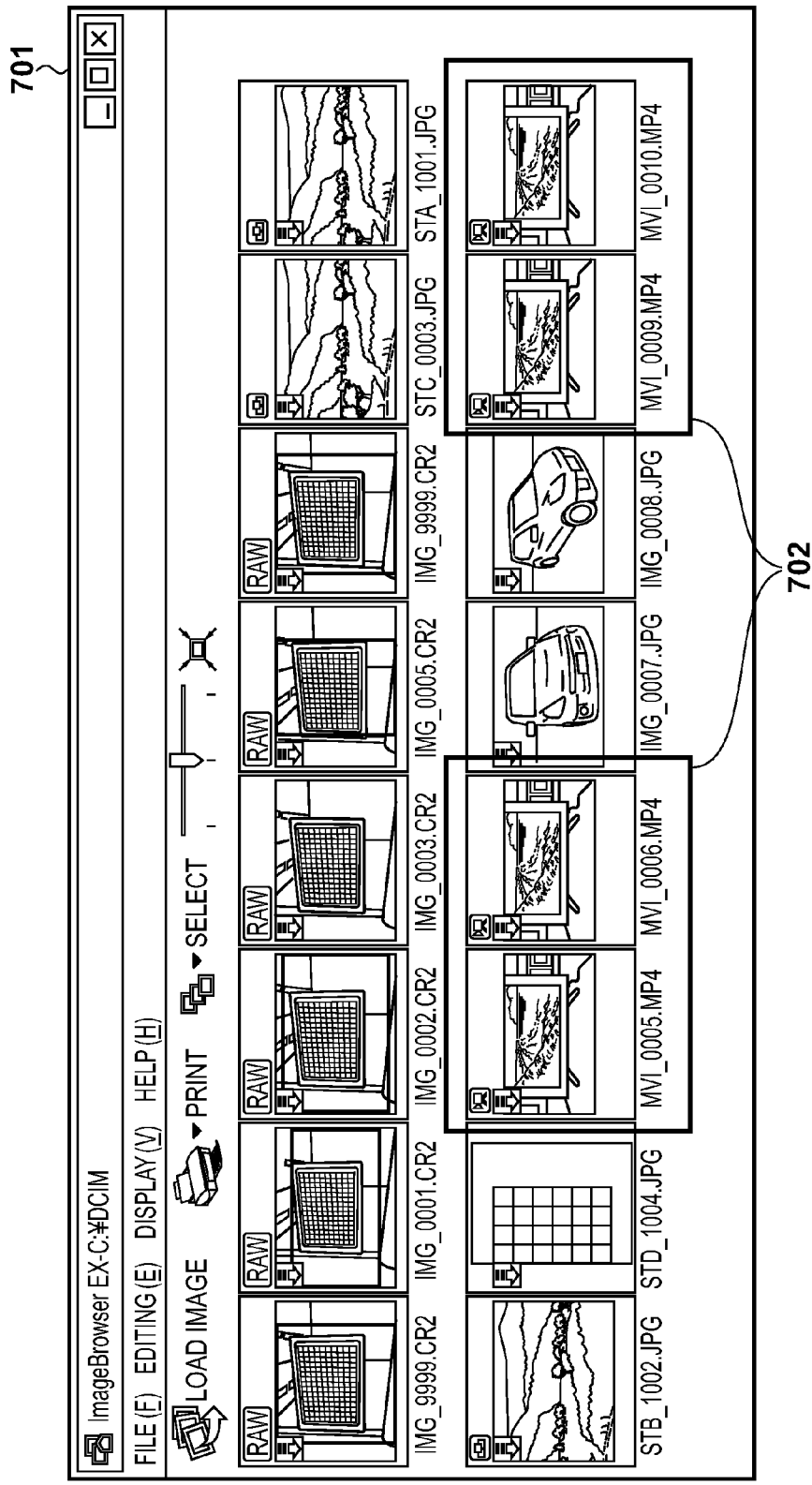
FIG. 7 is a diagram illustrating an example of an UI screen displayed by an image management application according to the present embodiment.

In step S504, the CPU 203 loads the files selected from a file list screen shown in FIG. 7 into the designated loading destination.

In step S505, the CPU 203 determines whether all the files to be loaded are checked, and if there is any file that has not yet been checked, the CPU 203 returns to step S502, and continues the processing. Note that files are checked independently in the present example, but a configuration is also possible in which all the files to be loaded are checked and loaded altogether.

Processing for Setting a File Loading Destination

The following will describe, with reference to FIG. 6, processing for setting a destination folder into which a group of moving images shot in succession are to be loaded. The present example describes the case where a folder having the file name of the leading moving image of the same group is created and the group of moving images shot in succession are loaded into this folder, but a configuration is also possible in which a folder having any name, instead of the file name of the leading moving image, is created.

In step S601, the CPU 203 determines whether the file to be loaded is the leading file, that is, whether PID=0000 is met for the file. If the file to be loaded is the leading file, the procedure advances to step S610, where the CPU 203 sets a folder having this file name as the loading destination. If it is determined that the file to be loaded is not the leading file, the procedure advances to step S602, where the CPU 203 sets this file as the current image.

In step S603, the CPU 203 searches a DCIM folder in the ascending order, and determines whether there is a file-break file list in which groups of file names and IDs of the group of moving images shot in succession are stored. The reason why the file-break file list in ascending order is created in the DCIM folder is that an ordinary camera or application displays images in this order. Examples of a screen of the list will be described later. If it is determined in step S603 that there is no file-break file list, the procedure advances to step S604, where the CPU 203 creates a file-break file list.

In step S605, the CPU 203 compares the UID of the file-break file list with UID of the current image, and searches for the position of the current image on the file-break file list.

In step S606, the CPU 203 determines whether continuity exists between the current image and one image before the current image on the file-break file list, using the processing of FIG. 4.

As the result of the determination in step S606, if it is determined that no continuity exists, the procedure advances to step S610, where the CPU 203 sets a folder having the file name of the current image as the loading destination. Also, if it is determined that continuity exists, the procedure advances to step S608, where the CPU 203 defines one image before the current image, as the current image.

In step S609, the CPU 203 determines whether there is an image before the current image on the file-break file list, and if there is such an image, the procedure returns to step S606, and if there is no such image, the procedure advances to step S610, where the CPU 203 sets a folder having the file name of the current image as the loading destination.

In the present example, although the folder having the file name of the leading file is created, another folder name, such as "group 1", indicating that a moving image group is loaded altogether may be used.

FIG. 7 shows an example of an application screen that displays a list of files stored in the memory card, and on which a user designates images to be loaded into the PC 200.

In a screen 701 shown in FIG. 7, thumbnails of the image files stored in the DCIM folder of the memory card are displayed in ascending order of the folders. Commonly, files of images shot by a camera are recorded in a format conforming to the DCF standard, and thus it is most efficient to determine whether continuity exists based on the serial number of file names. It is assumed that moving images enclosed by frames 702 so as to be identifiable belong to a group of moving images shot in succession. For example, when only MVI_006.MP4 is selected and loaded, it is suitable that MVI_006.MP4 is loaded into the folder "MVI_005" having the file name of MVI_005.MP4, which is the leading file of the same group of MVI_006.MP4 . If the file of the current image is MVI_006.MP4, the file of one image before the current image on the file-break file list is MVI_005.MP4, and thus determination will be made as to whether continuity exists between MVI_006.MP4 and MVI_005.MP4 . In the present case, since it is determined that continuity exists, the current image is changed to MVI_005.MP4, and it is searched whether the file-break file list includes a file-break MP4 file that is successive previous to MVI_005.MP4 . The result shows that there is no file-break MP4 file before MVI_005.MP4, and thus the folder "MVI_005" having the file name "MVI_005.MP4" of the current image can be set as the loading destination.

Figure 8:
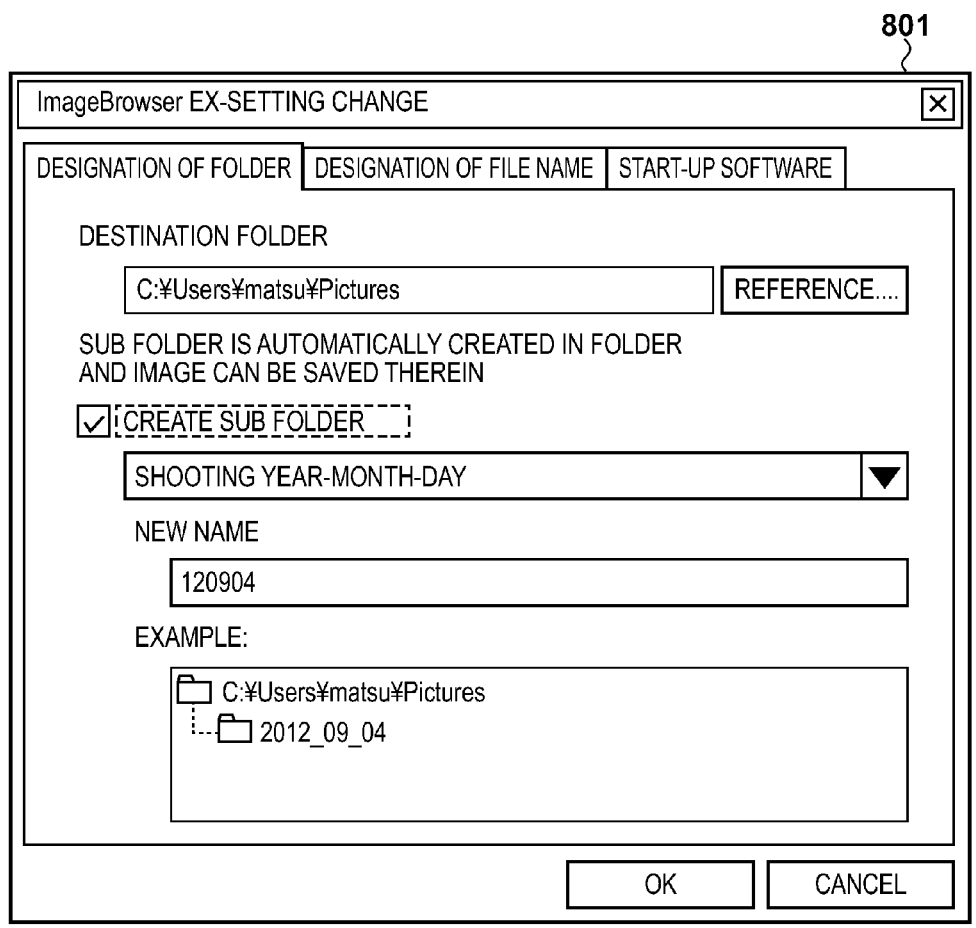
FIG. 8 is a diagram illustrating an example of an UI screen for designating a destination folder in the file loading processing according to the present embodiment.

FIG. 8 shows an example of a dialog screen for designating a destination folder for loading.

On a screen 801 shown in FIG. 8, a user can select a destination folder in which the files in the memory card are saved, and can further select whether to create a sub folder in this destination. For example, if a check is made to create a sub folder and selection of shooting year-month-day is made, a folder that corresponds to the shooting date of an image is created in the destination folder, and the image can be loaded in this folder. In the case where a group of moving images shot in succession is to be loaded, it is also possible to create a sub folder even if no check is made to create a sub folder.

Figure 9:
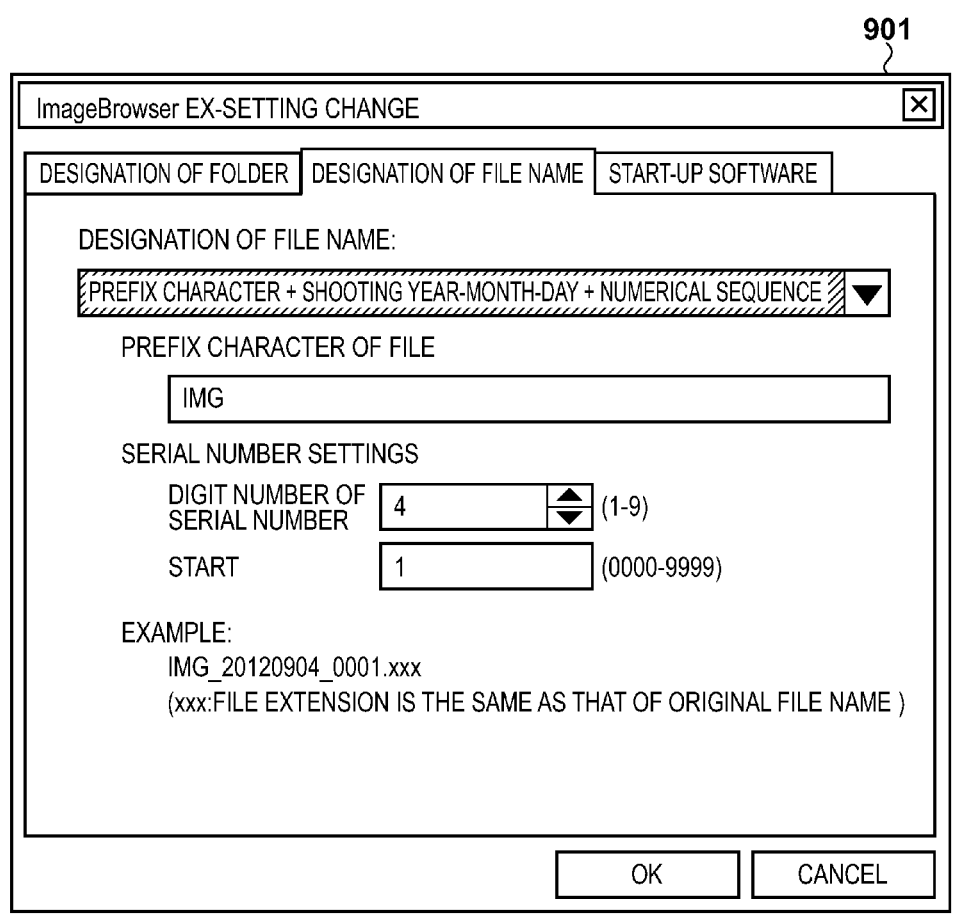
FIG. 9 is a diagram illustrating an example of an UI screen for designating a file name in the file loading processing according to the present embodiment.

FIG. 9 shows an example of a dialog screen for designating a file name.

On a screen 901 shown in FIG. 9, a user can designate a file name of an image to be loaded. This function corresponds to the processing in step S605 of FIG. 6. As described with reference to FIG. 5, if a group of shot moving images is loaded altogether in a specific folder, the file name stored in the DCIM folder is used, instead of the file name set on this screen 901.

Figure 10:
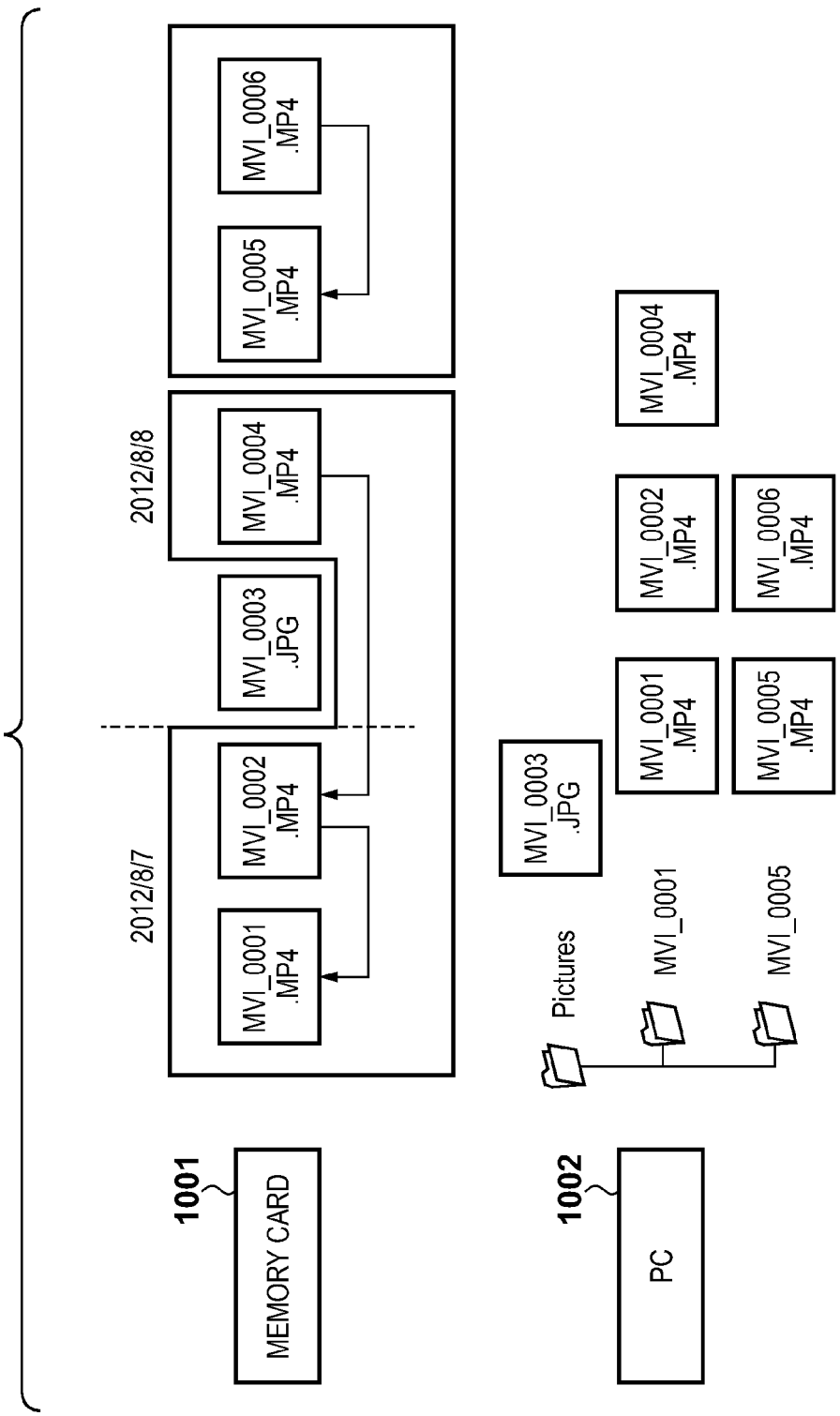
FIG. 10 is a diagram illustrating an example of folder structure after a moving image file is loaded by a first file load processing, according to the present embodiment.

FIG. 10 shows an example of the folder structure in the case where all of images are selected and loaded, with the settings in which no sub folder is created, by a first file load processing.

In the memory card 1001, MVI_001.MP4, MVI_002.MP4, and MVI_004.MP4 are files of moving images shot in succession whose shooting date and time are from 2012/8/7 to 2012/8/8. MVI_003.JPG is a file of a still image shot during a shooting of this moving image. MVI_005.MP4 and MVI_006.MP4 are files of moving images that were shot in succession after a shooting of a moving image was stopped. MVI_001.MP4, MVI_002.MP4, and MVI_004.MP4 are in the same group, and MVI_005.MP4 and MVI_006.MP4 are in the same group.

If settings are made on the screen 801 of FIG. 8 such that no sub folder is created, and all the images are selected and loaded, the loading of the files is performed in the PC 1002 with the folder structure as shown in the figure. A folder having the file name of the leading file in each group is created, and a group of moving images shot in succession is loaded in this folder. The same folder structure is achieved when MVI_001.MP4 and MVI_002.MP4 are loaded and then from MVI_003.JPG to MVI_006.MP4 are loaded, or when loading is cancelled and then one or more unloaded files are loaded. This is because a destination folder for loading is set according to the procedures of FIG. 6.

Figure 11:
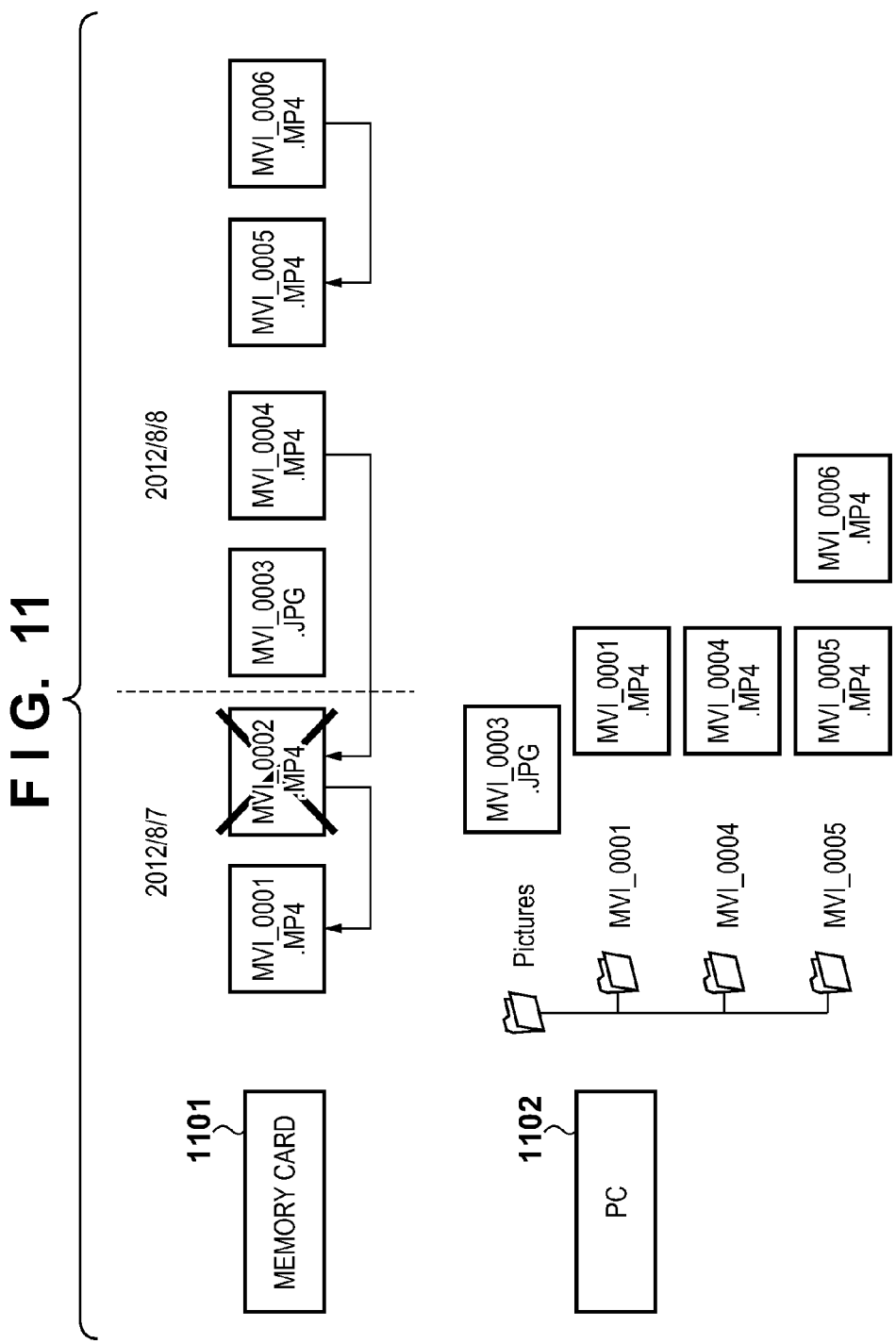
FIG. 11 is a diagram illustrating an example of folder structure after a moving image file is loaded by a second file load processing, according to the present embodiment.

FIG. 11 shows an example of the folder structure in the case where, by a second file load processing, some of images are loaded with the settings in which no sub folder is created, then the loaded images are deleted, and finally the residual images are loaded.

When MVI_001.MP4 and MVI_002.MP4 are loaded, then MVI_002.MP4 in the memory card 1101 is deleted, and finally MVI_003.JPG to MVI_006.MP4 are loaded, the loading of the files is performed in the PC 1102 with the folder structure shown in the drawing. When MVI_004.MP4 is loaded, a file-break file list is created and it is determined whether continuity exists between MVI_004.MP4 and one image before MVI_004.MP4, since MVI_004.MP4 is a moving image file shot in succession but not the leading file. It is determined whether continuity exits between MVI_004.MP4 and MVI_001.MP4 that is located before MVI_004.MP4 . In the present case, it is determined that continuity does not exist, and thus the folder having the file name of "MVI_004.MP4" of the current image is created, and MVI_004.MP4 is loaded in this folder. Note here that, although the description is given on the case where MVI_002.MP4 is deleted, the same result is produced when, for example, MVI_003.JPG is replaced by MVI_003.MP4, which is a not-successive file-break MP4 file and the replaced MVI_003.MP4 is loaded, since it is determined that continuity does not exist between MVI_003.MP4 and MVI_004.MP4 . Such a case does not commonly occur, and thus a method for determining whether there is a group of moving images shot in succession based on the numerical sequence of file names is efficient.

Figure 12:
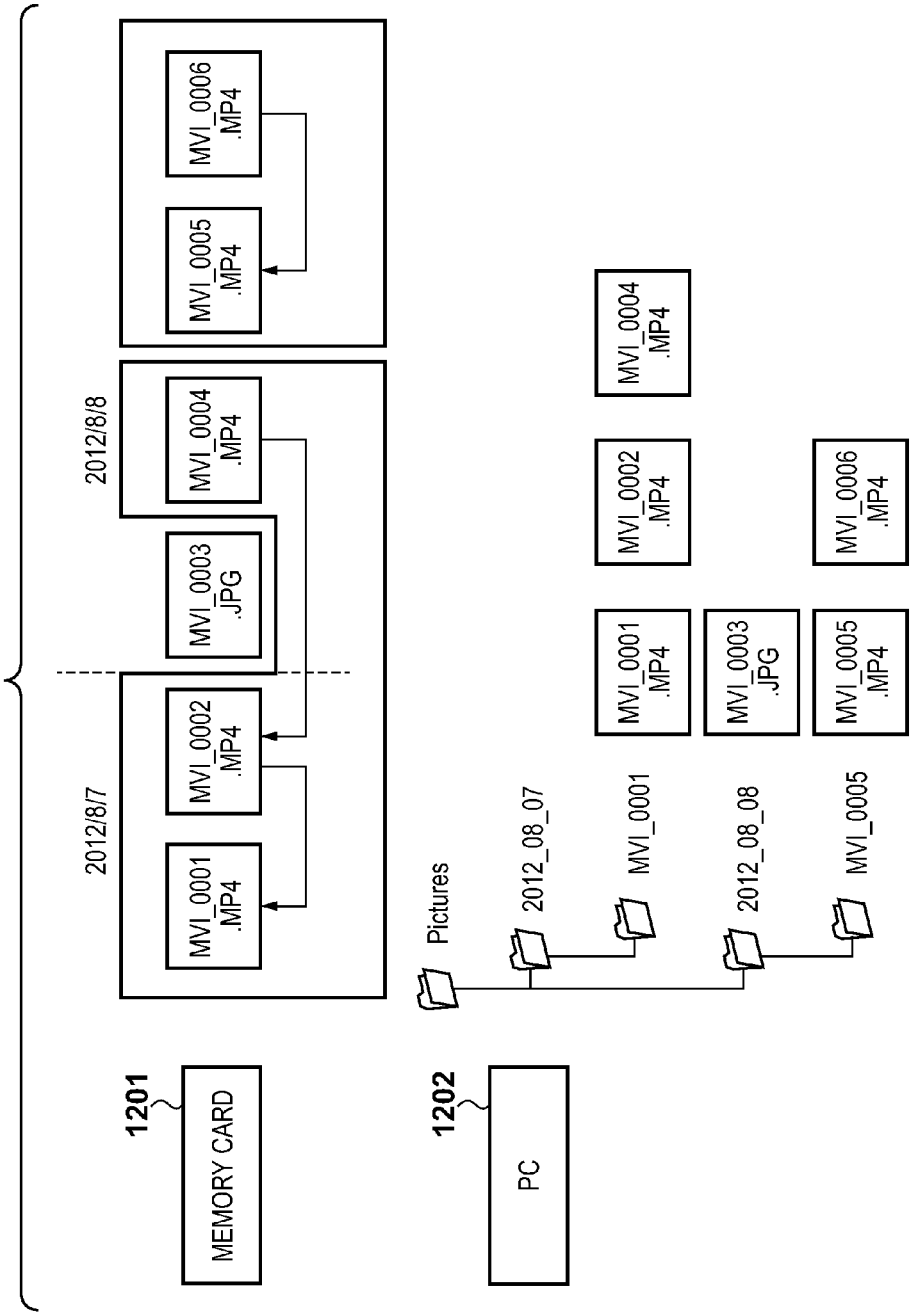
FIG. 12 is a diagram illustrating an example of folder structure after a moving image file is loaded by a third file load processing, according to the present embodiment.

FIG. 12 shows an example of the folder structure in the case where all of images are selected and loaded, with the settings in which a sub folder is created, by a third file load processing. The files in the memory card 1201 are the same as those in the memory card 1001 of FIG. 10. This is an example of the folder structure in the case where a check is made on the screen 801 of FIG. 8 to create a sub folder and selection of shooting year-month-day is made. The shooting date of MVI_004.MP4 is 2012/8/8, but MVI_004.MP4 is loaded in the "MVI_001" folder of MVI_001.MP4 and MVI_002.MP4 of the same group to which MVI_004.MP4 belongs. Since the user has shot the moving image successively from 2012/8/7, the user does not consider that only MVI_004.MP4 was shot on 2012/8/8. Therefore, file management is easy for a user when loading such files in the same folder. Also, another reason is that file combining processing is made simple.

Note that, in the above-described example, when a plurality of files in the same group are saved in folders according to the shooting date and time, a folder is created according to the shooting date of the leading file, but a folder may also be created according to the last shooting date and time.

As described above, since files shot over days are not saved in different folders, the user can manage files in an easily understood manner particularly according to the date and time at which shooting was started or ended.

Moving Image File Combining Processing

Hereinafter, processing for combining a group of moving images shot in succession will be described with reference to FIG. 13.

Note that the following procedure is realized by the CPU 203 executing the application installed in the PC 200.

Figure 13:
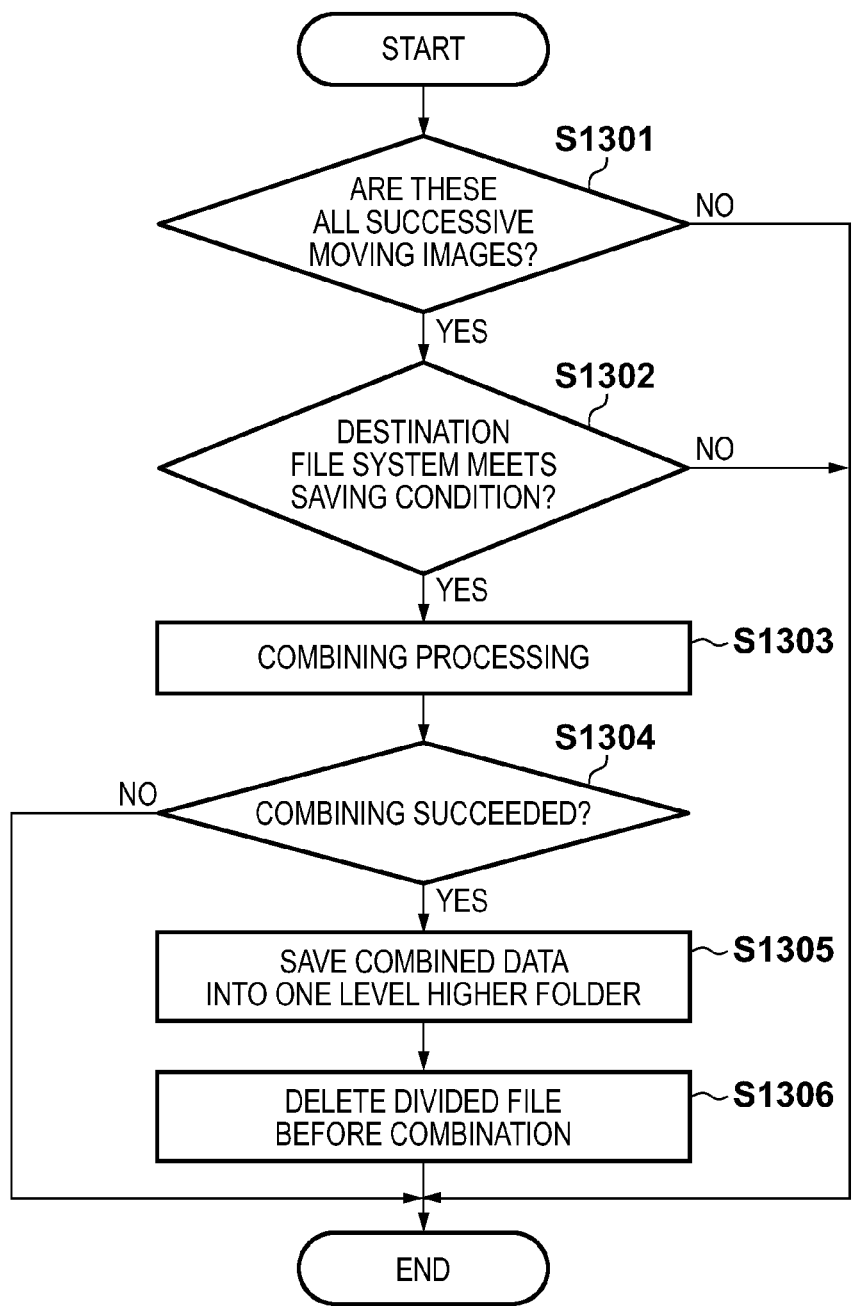
FIG. 13 is a flowchart illustrating file combining processing according to the present embodiment.

In FIG. 13, the CPU 203 determines in step S1301 whether all of successive moving image files are present. For example, MVI_001.MP4, MVI_002.MP4, and MVI_004.MP4 of FIG.

3 belong to a group of successive moving images, but even if any one of the files is lacking, combining does not make sense as a moving image, and thus no combining processing is executed. Accordingly, if all of the files are present, the procedure advances to step S1302. Determination as to whether all of the successive moving image files are present is made using the processing of FIGS. 2 and 4.

In step S1302, the CPU 203 determines whether a file system of a destination in which the combined files are to be saved meets the saving condition. For example, if the file system of the destination is FAT32, the upper limit of the file size of one file is predetermined to be 4 GB, and thus combining processing will obviously fail if it is clear that the file size of the combined files exceeds 4 GB. For example, combining processing in step S1303 is executed only when the saving condition of the file system, such as combining processing starts in the case of NTFS, is met. Note that the combining processing in step S1303 is a well-known technique and thus a description thereof is omitted.

In step S1304, the CPU 203 determines whether the processing for combining files has succeeded, and if it has succeeded, the procedure advances to step S1305.

Figure 14:
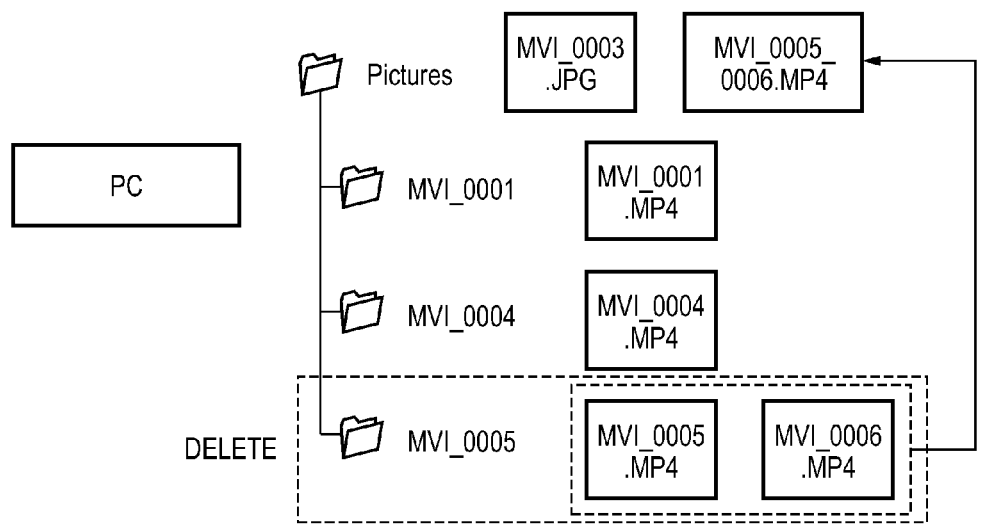
FIG. 14 is a diagram illustrating an example of folder structure after moving image files are combined by the file combining processing, according to the present embodiment.

In step S1305, the CPU 203 stores the combined moving image data in a one level higher folder. In the case of the folder structure of FIG. 14, for example, MVI_005_0006.MP4 obtained by combining MVI_005.MP4 and MVI_006.MP4 in the folder "MVI_005" is stored in the one level higher folder "Pictures". Also, associated information of the combined files is changed so as to lack both NID and PID, or have NID and PID of 0000 (or Null).

In step S1306, the CPU 203 deletes the files before combination. In the case of the folder structure shown in FIG. 14, for example, the entire folder "MVI_005" in which MVI_005.MP4 and MVI_006.MP4 are stored is deleted.

Accordingly, since the combining processing is executed only if all of moving image files are present, and the saving condition of the file system is met, it is not necessary to perform wasted combining processing.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-019886, filed Feb. 4, 2013 which is hereby incorporated by reference herein in its entirety.

What is claimed is:

1. An image processing apparatus for processing a plurality of moving image files each including added file numbers based on a predetermined order and each including associated information relating to a continuity between a moving image file and another moving image file, comprising:
    an obtaining unit configured to obtain the associated information of the plurality of moving image files,
    wherein the associated information includes first identification information indicating a moving image file which is continuously recorded before the moving image file during a shooting of a moving image and second identification information indicating a moving image file which is continuously recorded after the moving image file during the shooting of the moving image;
    a detecting unit configured to detect, from among the plurality of moving image files, a plurality of moving image files of the same group which are divided and continuously recorded during the shooting of the moving image, in accordance with the associated information of the plurality of moving image files obtained by the obtaining unit,
    wherein the detecting unit checks the associated information of the moving image files obtained by the obtaining unit in numeric order corresponding to the file numbers, and detects the plurality of moving image files of the same group; and
    a combining unit configured to perform combining processing for combining the plurality of moving image files of the same group,
    wherein the combining unit combines the plurality of moving image files of the same group into one file based on their shooting order.

2. The apparatus according to claim 1, further comprising a display unit configured to identifiably display the plurality of moving image files of the same group.

3. The apparatus according to claim 1, further comprising a storing unit configured to store the plurality of moving image files of the same group in one folder.

4. The apparatus according to claim 1, wherein
    the detecting unit detects the moving image files based on extensions of the moving image files to be detected, in numeric order corresponding to the file numbers and detects as the moving image files of the same group, a predetermined moving image file and a moving image file which is continuously recorded before the predetermined moving image file or a moving image file which is continuously recorded after the predetermined moving image file, based on the associated information.

5. The apparatus according to claim 1, wherein the combining unit does not perform the combining processing if all of the plurality of moving image files of the same group are not present, or a file to be generated by the combining processing do not meet a storing condition of a file system of the destination for storing.

6. The apparatus according to claim 1, wherein the combining unit stores a file generated by the combining processing in a folder and deletes the plurality of moving image files before combination when the combining processing for combining the plurality of moving image files of the same group has succeeded.

7. A control method of an image processing apparatus for processing a plurality of moving image files each including added file numbers based on a predetermined order and each including associated information relating to a continuity between a moving image file and another moving image file, the method comprising:
   obtaining the associated information of the plurality of moving image files,
   wherein the associated information includes first identification information indicating a moving image file which is continuously recorded before the moving image file during a shooting of a moving image and second identification information indicating a moving image file which is continuously recorded after the moving image file during the shooting of the moving image;
   detecting, from among the plurality of moving image files, a plurality of moving image files of the same group which are divided and continuously recorded during the shooting of the moving image, in accordance with the associated information of the plurality of moving image files obtained in the obtaining,
   wherein in the detecting, the associated information of the moving image files obtained in the obtaining are checked in numeric order corresponding to the file numbers, and the plurality of moving image files of the same group are detected; and
   performing combining processing for combining the plurality of moving image files of the same group,
   wherein in the combining processing, the plurality of moving image files of the same group are combined into one file based on their shooting order.

8. A non-transitory computer-readable storage medium storing a program for causing a computer to execute a control method of an image processing apparatus for processing a plurality of moving image files each including added file numbers based on a predetermined order and each including associated information relating to a continuity between a moving image file and another moving image file, the method comprising:
   obtaining the associated information of the plurality of moving image files,
   wherein the associated information includes first identification information indicating a moving image file which is continuously recorded before the moving image file during a shooting of a moving image and second identification information indicating a moving image file which is continuously recorded after the moving image file during the shooting of the moving image;
   detecting, from among the plurality of moving image files, a plurality of moving image files of the same group which are divided and continuously recorded during the shooting of the moving image, in accordance with the associated information of the plurality of moving image files obtained in the obtaining,
   wherein in the detecting, the associated information of the moving image files obtained in the obtaining are checked in numeric order corresponding to the file numbers, and the plurality of moving image files of the same group are detected; and
   performing combining processing for combining the plurality of files of the same group,
   wherein in the combining processing, the plurality of moving image files of the same group are combined into one file based on their shooting order.

* * * * *